United States Patent
Eckert et al.

(10) Patent No.: US 9,876,416 B2
(45) Date of Patent: Jan. 23, 2018

(54) METHOD FOR PRODUCING AN ELECTRICAL MACHINE FOR VEHICLE CLAW POLE COMPRISING A CENTERING POINT

(71) Applicant: Robert Bosch GmbH, Stuttgart (DE)

(72) Inventors: Rolf Eckert, Rutesheim (DE); Horst Fees, Bietigheim-Bissingen (DE)

(73) Assignee: SEG Automotive Germany GmbH, Stuttgart (DE)

( * ) Notice: Subject to any disclaimer, the term of this patent is extended or adjusted under 35 U.S.C. 154(b) by 338 days.

(21) Appl. No.: 14/514,647

(22) Filed: Oct. 15, 2014

(65) Prior Publication Data
US 2015/0026963 A1 Jan. 29, 2015

Related U.S. Application Data

(62) Division of application No. 13/259,257, filed as application No. PCT/EP2010/053207 on Mar. 12, 2010, now abandoned.

(30) Foreign Application Priority Data

Mar. 23, 2009 (DE) .................... 10 2009 001 745

(51) Int. Cl.
*H02K 1/22* (2006.01)
*H02K 15/16* (2006.01)
*H02K 1/24* (2006.01)
*H02K 15/02* (2006.01)

(52) U.S. Cl.
CPC ........... *H02K 15/165* (2013.01); *H02K 1/226* (2013.01); *H02K 1/243* (2013.01); *H02K 15/022* (2013.01); *Y10T 29/49009* (2015.01)

(58) Field of Classification Search
CPC .... H02K 15/022; H02K 15/165; H02K 1/226; H02K 1/243; Y10T 29/49009
See application file for complete search history.

(56) References Cited

U.S. PATENT DOCUMENTS

| | | |
|---|---|---|
| 5,229,672 A | 7/1993 | Iwaki |
| 5,539,265 A | 7/1996 | Harris et al. |
| 5,933,003 A | 8/1999 | Hebing et al. |
| 6,541,890 B2 * | 4/2003 | Murata .................. H02K 1/243 310/263 |
| 2002/0021052 A1 | 2/2002 | Asao |

(Continued)

FOREIGN PATENT DOCUMENTS

| | | |
|---|---|---|
| CN | 1277131 | 12/2000 |
| CN | 101559842 | 10/2009 |
| FR | 2789240 | 8/2000 |

OTHER PUBLICATIONS

PCT/EP2010/053207 International Search Report dated Sep. 17, 2010 (6 pages).

*Primary Examiner* — Minh Trinh
(74) *Attorney, Agent, or Firm* — Michael Best & Friedrich LLP

(57) ABSTRACT

Method for making an electrical machine (10), especially a three-phase generator for vehicles, that comprises a stator (16) and a rotor (20). The rotor (20) comprises a first and a second claw pole (22, 23) from which claw pole fingers (24) respectively extend in the axial direction from claw pole roots (60). A centering point (74) for a tool is located on a rear radius (72) of the claw pole roots (60).

20 Claims, 2 Drawing Sheets

(56) References Cited

U.S. PATENT DOCUMENTS

| | | | |
|---|---|---|---|
| 2004/0036376 A1* | 2/2004 | Pflueger | H02K 21/044 |
| | | | 310/263 |
| 2004/0124723 A1 | 7/2004 | Ihata et al. | |
| 2012/0086304 A1 | 4/2012 | Eckert et al. | |
| 2014/0265710 A1* | 9/2014 | Zook | H02K 1/243 |
| | | | 310/195 |
| 2015/0026963 A1* | 1/2015 | Eckert | H02K 1/243 |
| | | | 29/596 |
| 2015/0229181 A1* | 8/2015 | Tanaka | H02K 1/243 |
| | | | 310/51 |

* cited by examiner

METHOD FOR PRODUCING AN ELECTRICAL MACHINE FOR VEHICLE CLAW POLE COMPRISING A CENTERING POINT

RELATED APPLICATIONS

This application is a divisional of pending U.S. application Ser. No. 13/259,257, filed Dec. 12, 2011, which is a U.S. 371 National Phase filing of PCT/EP2010/053207, filed Mar. 12, 2010, which claims priority to German Application No. 10 2009 001 745.3, filed Mar. 23, 2009. The entire contents of all of the foregoing are hereby incorporated by reference.

BACKGROUND OF THE INVENTION

EP 0 783 700 B1 relates to a rotor arrangement for an electric machine. A rotor for an electric machine is disclosed, which rotor comprises a coil core, having a center point, wherein a rotational axis runs through the center point. The rotor comprises radially outwardly protruding first and second walls as well as a wire which is wound around a coil core, between the first and second walls, which wire constitutes the winding. Said wire comprises at least one tab which protrudes radially from the center point, pointing from the first wall of the coil core, wherein each tab is formed bent down onto the field winding in the assembled rotor. A notch is formed in the radially outer end of each tab.

U.S. Pat. No. 5,229,672 presents an electric machine which is embodied as a generator and which has a rotor. The electric machine is embodied as a claw pole generator, wherein the claw poles of two claw pole boards engage one in the other. For balancing, notches or drillholes, with which the generator is balanced after completion, are provided arranged distributed with respect to one another along the circumferential direction of the rotor.

FR 2 789 240 A1 relates to a generator for applications in motor vehicles. This generator is also a claw pole generator in which individual claw poles which are formed on claw pole boards engage one on the other. A balancing drillhole is arranged in the region of the claw pole roots which constitute a junction between a plate part of the claw pole board and the individual claw poles which are oriented bent through 90° with respect to said claw pole board.

During the fine balancing of components of an electric machine, for example a generator for use in motor vehicle applications, the rotor must be balanced. This is preferably carried out on the cold-shaped claw poles in the region of the claw pole roots on the back radius by providing fine balance drillholes. The fine balance drillholes constitute a locally concentrated removal of material, as a result of which the rotor of the generator, in particular of a claw pole generator, can be balanced after the mounting. Fine balancing of the rotor of this embodiment of electric machines is thus significant since the rotor in claw pole generators rotates with rotational speeds of the order or magnitude of 18 000 min$^{-1}$ and higher. The greater the precision with which the balance drillholes, i.e. the fine balance drillholes, can be provided, the greater the quietness of the running of the electric machine which can be achieved. Furthermore, a very long service life of the roller bearings with which the rotor is mounted in the housing, i.e. the stator part of the claw pole generator, can be achieved by extremely precise balancing of the rotor of the claw pole generator.

The provision of fine balance drillholes in the region of the claw pole root on the back radius often leads to misalignment of the drill since drilling occurs at the apex point of the radius of the claw pole root in order to generate removal of material precisely at this point. This can lead to damage to the fan which has already been mounted on the shaft of the rotor or to breaking of the drills.

SUMMARY OF THE INVENTION

The invention is based on the object of simplifying the manufacture of balance drillholes on the rotor of an electric machine which is operated at a high rotational speed.

According to the solution proposed by the invention, a center is preferably provided on the back radius of the claw pole root, which center both prevents misalignment of the drill and permits greater flexibility in the fabrication in terms of relatively steep drilling angles. This center can be embodied, for example during the fabrication of the claw pole or the claw pole board, as a depression on the back radius of the claw pole root, that is to say for example in the form of a centering point, in the form of a sphere or with various other geometries, for example as a square funnel or the like. This depression, which is fabricated on the back radius of the claw pole board, on the one hand ensures a precise position of the fine balance drillhole and, on the other hand, avoids damage to a fan which is already attached to the premounted rotor, since the misalignment of the drillhole is then ruled out. The back radius, provided with a center, of the claw pole root permits relatively steep drilling angles, which, on the one hand, permits greater flexibility in terms of the location of the removal of material for balancing the rotor, and, on the other hand, facilitates the mounting and last but not least can decisively improve the quality of the fine balancing.

The provision of the center as proposed in the invention for the application of the material-removing drill can be carried out along the entire length of the back radius of the claw pole root.

BRIEF DESCRIPTION OF THE DRAWINGS

The invention will be explained in more detail below on the basis of the drawing, in which.

DETAILED DESCRIPTION

Figure 1:
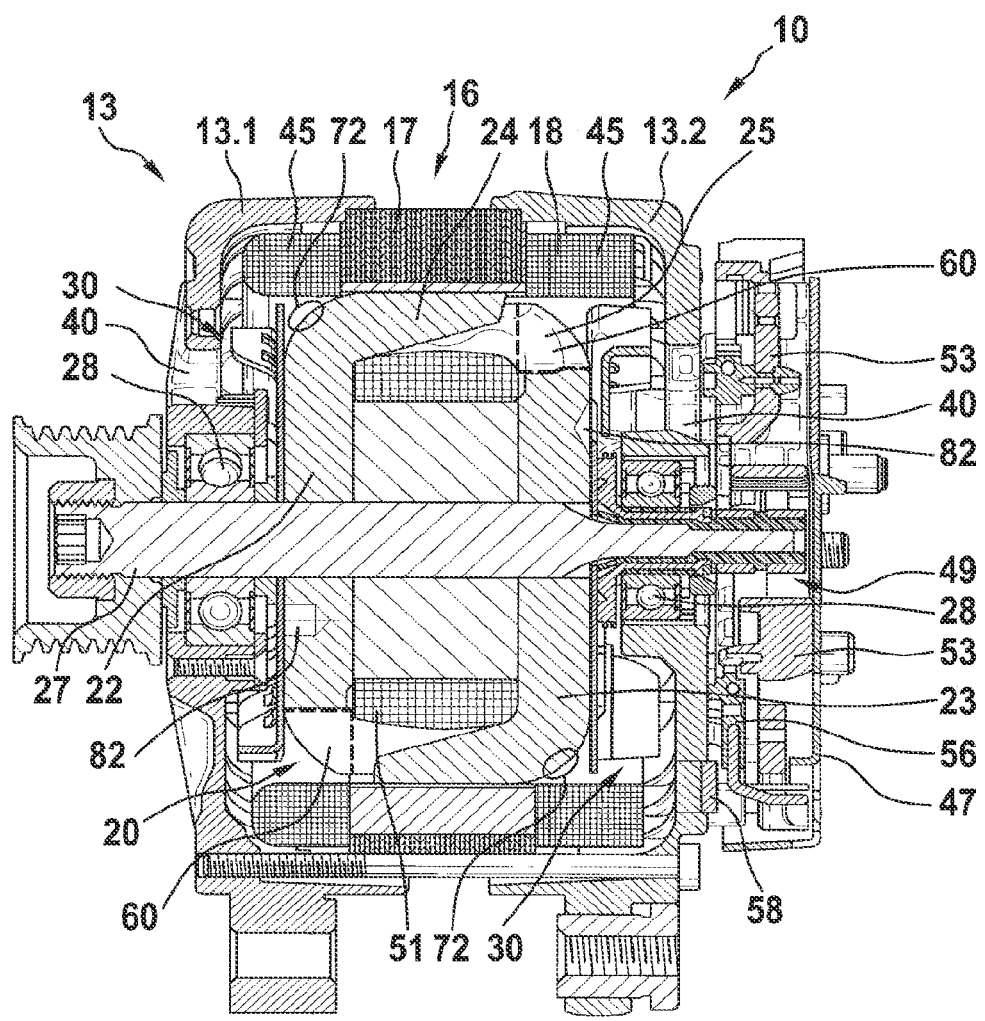
FIG. 1 shows a cross section through an electric machine which is embodied as a claw pole generator.

FIG. 1 shows a cross section through an electric machine 10, here in the embodiment as a generator for motor vehicles.

This electric machine 10 has, inter alia, a two-component housing 13 which is composed of a first end plate 13.1 and a second end plate 13.2. The end plate 13.1 and the end plate 13.2 hold a stator 16 which is composed, on the one hand, of an essentially annular iron stator core 17, and a stator winding 18 is inserted into the axially extending, radially inwardly directed grooves thereof.

The stator 16 which is of annular design surrounds, with its radially inwardly directed, grooved surface, a rotor 20 which is embodied as a claw pole rotor. The rotor 20 comprises, inter alia, two claw poles 22 and 23 on whose outer circumference claw pole fingers 24 and 25 which extend in the axial direction are respectively arranged. The two claw poles 22 and 23 are arranged in the rotor 20 in such a way that the claw pole fingers 24 and 25 thereof, which extend in the axial direction, alternate with one another on the circumference of the rotor 20. Intermediate spaces, magnetically required as a result of this, are produced between the oppositely magnetized claw pole fingers 24 and 25, which are referred to as claw pole intermediate spaces. The rotor 20 is rotatably mounted in the respective end plates 13.1 and 13.2 of the housing 13 by means of a shaft 27 and, in each case, one roller bearing 28 which is located on, in each case, one side of the rotor.

The rotor 20 has a total of two axial end faces, on each of which a fan 30 is attached. This fan 30 is composed essentially of a plate-shaped or disk-shaped section from which fan blades protrude in a known manner. These fans 30 serve to permit air to be exchanged between the outside of the electric machine 10 and the interior of the electric machine 10 via openings 40 in the end plates 13.1 and 13.2. For this purpose, the openings 40 are provided essentially on the axial ends of the end plates 13.1 and 13.2, via which cooling air is sucked into the interior of the electric machine 10 by means of the fans 30. This cooling air is accelerated radially outward through the rotation of the fans 30, with the result that said cooling air passes through the winding overhang 45 which is permeable to cooling air. This effect cools the winding overhang 45. After the cooling air passes through the winding overhang 45 or after it flows around this winding overhang 45, it travels a certain distance radially toward the outside, through openings not illustrated here in FIG. 1.

On the right-hand side of FIG. 1 there is a protective cap 47 which protects various components against ambient influences. The protective cap 47 covers, for example, a slip ring assembly 49 which serves to supply an exciter winding 51 with exciter current. A cooling element 53, which acts here as a positive cooling element, is arranged around this slip ring assembly 49. The end plate 13.2 acts as a negative cooling element. Between the end plate 13.2 and the cooling element 53 there is a connecting plate 56 which serves to connect to one another negative diodes 58 arranged in the end plate 13.2 and positive diodes (not illustrated in the illustration according to FIG. 1) in the cooling element 53, and therefore to form a bridge circuit which is known per se.

The rotor 20 is mounted as illustrated above: Firstly, the shaft 27 is made ready. Subsequent to this, the pole core and the claw poles 22 and 23 are fitted onto the shaft 27. The component composed of the shaft 27, pole core and claw poles 22 and 23, which is premounted in this way, is pre-balanced in a first step. Pre-balancing drillholes 82, which are illustrated in FIG. 1, and are provided essentially on an outer side 70 within the carrier part 66 of the claw poles 22 and 23 of the rotor 20, serve for this purpose. Subsequent to this, the fans 30 are mounted and attached to the two end sides of the claw poles 22 and 23. The attachment of the fans 30 to the end sides of the claw poles 22, 23 can be carried out, for example, by means of spot welding. In conjunction with this working step, the slip rings or the slip ring assembly 49 are also attached.

From the illustration according to FIG. 1, it is apparent that due to the fan 30 fine balance drillholes can only be provided with difficulty in the region of a back radius 72 of the claw pole root 60.

In the present context, the claw pole root 60 is understood to be that region of a claw pole 22 or 23 from which the claw pole fingers 24, 25 which extend essentially in the axial direction protrude on an inner side of the claw poles 22 and 23. The claw pole root 60 characterizes the junction region within which there is a 90° orientation 62 (cf. illustration in FIG. 2), and the claw pole fingers 24, 25 of a carrier part of the claw pole 22, 23 which is embodied essentially in the shape of a plate are formed in such a way that they are bent through said 90° orientation 62.

Figure 2:
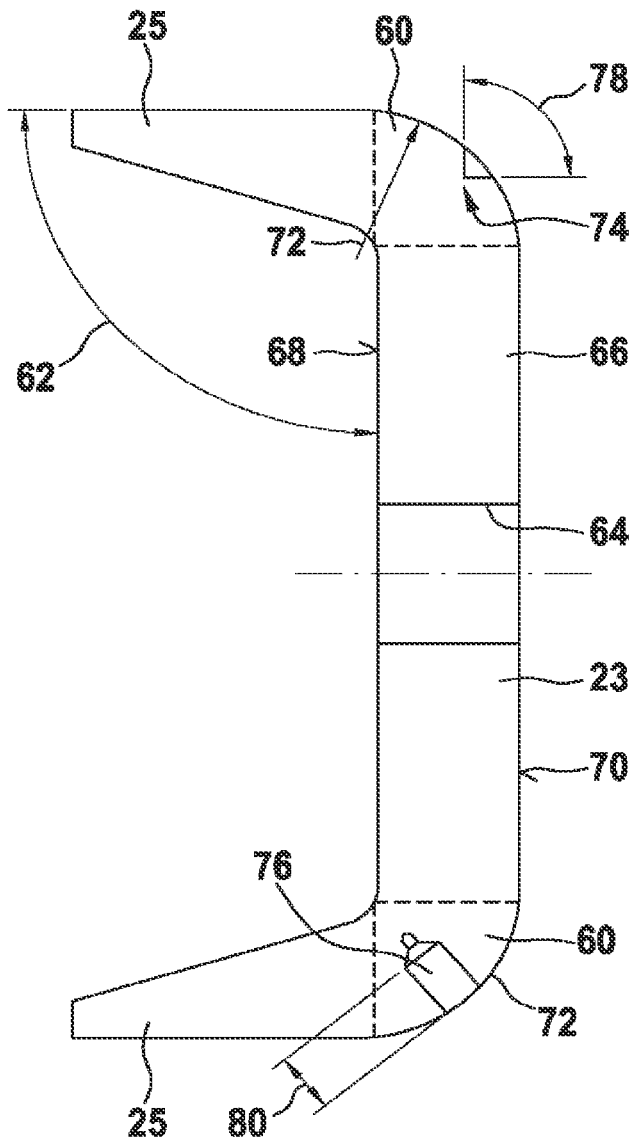
FIG. 2 shows a schematic illustration of a claw pole with claw pole fingers, a center and fine balance drillhole.

The illustration according to FIG. 2 clearly shows this region, which is denoted by reference signal 60. The claw pole root 60 is that region which forms the junction between the carrier part 66 (illustrated in FIG. 2) and the individual claw pole fingers 25, which protrude beyond an inner side 68 of the claw pole 23. This claw pole root 60 is defined by a back radius 72. As proposed according to the invention, a centering means 74 for a material-removing tool, which is generally a drill, is provided on this back radius 72. The centering means 74 can be located at any desired position along the back radius 72. The centering means 74 can be embodied as a depression, as a crown, as a centering point or else in the form of a sphere. Depending on the degree of aperture of a depression which is embodied, for example, in the form of a funnel and which serves as a centering means, a corresponding drilling angle region 78 for the material-removing tool, in particular a drill, is formed. The solution proposed according to the invention permits, by way of the relatively large drilling angle region 78, a fine balance drillhole 76 (also illustrated in FIG. 2) to be located in an optimum way in terms of the entry angle into the claw pole root 60. For the precise balancing of the rotor 20, which comprises a first claw pole 22 and a second claw pole 23 according to the illustration in FIG. 1, it is significant that not only the position of the fine balance drillhole 76 on the back radius 72 but also the profile thereof into the material of the claw pole 23 can be influenced with the result that balancing of the claw poles 22 and 23 which comes close to the ideal balancing result can be achieved. The centering means which is proposed according to the invention and which can be positioned at any desired location along the back radius 72 on the one hand ensures that the material-removing tool, generally a drill, does not become misaligned and, on the other hand, as explained already in conjunction with FIG. 1, damage to the fans 30 or the blades thereof during the manufacture of the balance drillhole 76 is avoided in the region of the claw pole root 60.

From the illustration according to FIG. 2 it is also apparent that a depth of the fine balance drillhole 76 on the back radius 72 of the claw pole root 60 is characterized by reference symbol 80. The depth 80 of the fine balance drillhole 76 determines the extent of the resulting material removal and is dependent on the degree of fine balance which is necessary on the respective pre-mounted assembly, comprising the shaft 27, the pole core and at least the two claw poles 22, 23, in order to ensure a qualitatively outstanding balancing result.

From the illustration according to FIG. 2 it is apparent that an opening 64—generally this is a drillhole—is formed symmetrically in the claw pole 23. The shaft 27 extends through this opening 64, cf. the illustration according to FIG. 1, said shaft 27 holding not only the further claw pole 22 but also the pole core and the slip ring assembly, cf. reference symbol 49.

In the illustration according to FIG. 2, an inner side of the claw pole 23 with reference symbol 68 is shown, the claw pole fingers 25 extending from said inner side in the axial direction parallel to the axis of symmetry of the claw pole 23. The fan 30 (illustrated in FIG. 1), which has been omitted from the illustration according to FIG. 2, is mounted on an outer side 70 of the claw pole 23 according to the illustration in FIG. 2.

From the illustration in FIG. 2 it is apparent that the claw pole roots 60 slide over between the carrier part 66 of the claw pole 23 and the individual claw pole fingers 25 through at least an angular range between 90° and 120°. In this range of the claw pole roots the back radius 72 is produced, on which back radius 72 the centering means 74 can be positioned at any desired position, viewed in the axial direction, depending on requirements.

Figure 3:
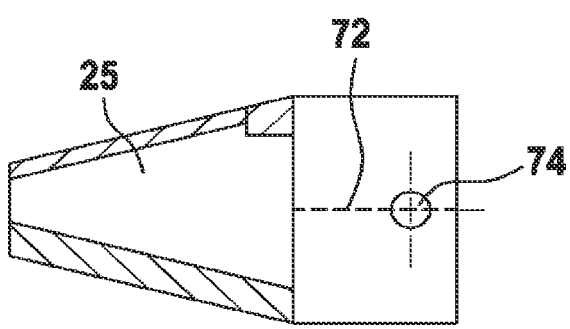
FIG. 3 shows a plan view of one of the claw pole fingers of the claw pole board according to FIG. 2.

Finally, the illustration according to FIG. 3 shows a plan view of the centering means 74 on the back radius 72 of the claw pole root 60. From the plan view according to FIG. 3 it is apparent that the centering means 74 illustrated there is positioned offset slightly with respect to the center point of the back radius 72.

What is claimed is:

1. A method for producing an electrical machine, the method comprising:
   providing a stator (16);
   providing a tool for use in producing the electrical machine;
   forming a rotor (20) including a first claw pole (22) and a second claw pole (23), wherein each claw pole (22, 23) includes claw pole fingers (24, 25) that originate at and axially extend away from respective claw pole roots (60), and wherein the claw pole roots (60) each have a rear radius (72),
   mounting the rotor (20) for rotation relative to the stator (16);
   attaching an element to the rotor (20);
   forming a centering point (74) on the rear radius (72) of one of the claw pole roots (60), wherein the forming of the centering point (74) is prior to at least one of the mounting of the rotor (20) for rotation relative to the stator (16) and the attaching of the element to the rotor (20);
   centering the tool in the centering point (74); and
   using the tool to produce a balancing hole (76) at the centering point (74) after centering the tool in the centering point (74).

2. The method according to claim 1, wherein the forming of the centering point (74) includes forming an indentation.

3. The method according to claim 1, wherein the forming of the centering point (74) includes forming a centering apex.

4. The method according to claim 1, wherein the forming of the centering point (74) includes forming the centering point (74) to have a circular shape.

5. The method according to claim 1, wherein the forming of the centering point (74) includes forming the centering point (74) to be funnel-shaped.

6. The method according to claim 1, wherein the forming of the centering point (74) includes forming the centering point (74) to define an angular range for start of drilling which corresponds to an aperture angle thereof.

7. The method according to claim 1, wherein the forming of the centering point (74) includes forming the centering point (74) during manufacture of the respective claw pole (22, 23).

8. The method according to claim 1, wherein the forming of the centering point (74) is prior to the attaching of the element to the rotor (20).

9. The method according to claim 8, wherein the forming of the centering point (74) is prior to the mounting of the rotor for rotation relative to the stator (16).

10. The method according to claim 9, wherein the element is attached after mounting the rotor (20) for rotation relative to the stator (16).

11. The method according to claim 10, wherein the element is attached to an axial end face of the rotor (20).

12. The method according to claim 11, wherein the element is a fan (30).

13. The method according to claim 10, wherein the element is a fan (30).

14. The method according to claim 1, wherein the centering of the tool in the centering point (74) is after attaching of the element to the rotor (20).

15. The method according to claim 14, wherein the mounting of the rotor (20) includes providing a shaft (27) and fitting the first claw pole (22) and the second claw pole (23) to the shaft (27) prior to the attaching of the element to the rotor (20).

16. The method according to claim 15, wherein the forming of the centering point (74) includes forming the centering point (74) during manufacture of the respective claw pole (22, 23).

17. The method according to claim 1, wherein the centering point (74) is formed before the mounting of the rotor (20) for rotation relative to the stator (16).

18. The method according to claim 17, wherein the element is attached after the mounting of the rotor (20) for rotation relative to the stator (16).

19. The method according to claim 18, wherein the element is attached to an axial end face of the rotor (20).

20. The method according to claim 19, wherein the centering of the tool in the centering point (74) is after the attaching of the element to the rotor (20).

* * * * *